May 6, 1947. C. V. BYMARK 2,420,224
TIRE INFLATOR
Filed Aug. 21, 1944 2 Sheets-Sheet 1
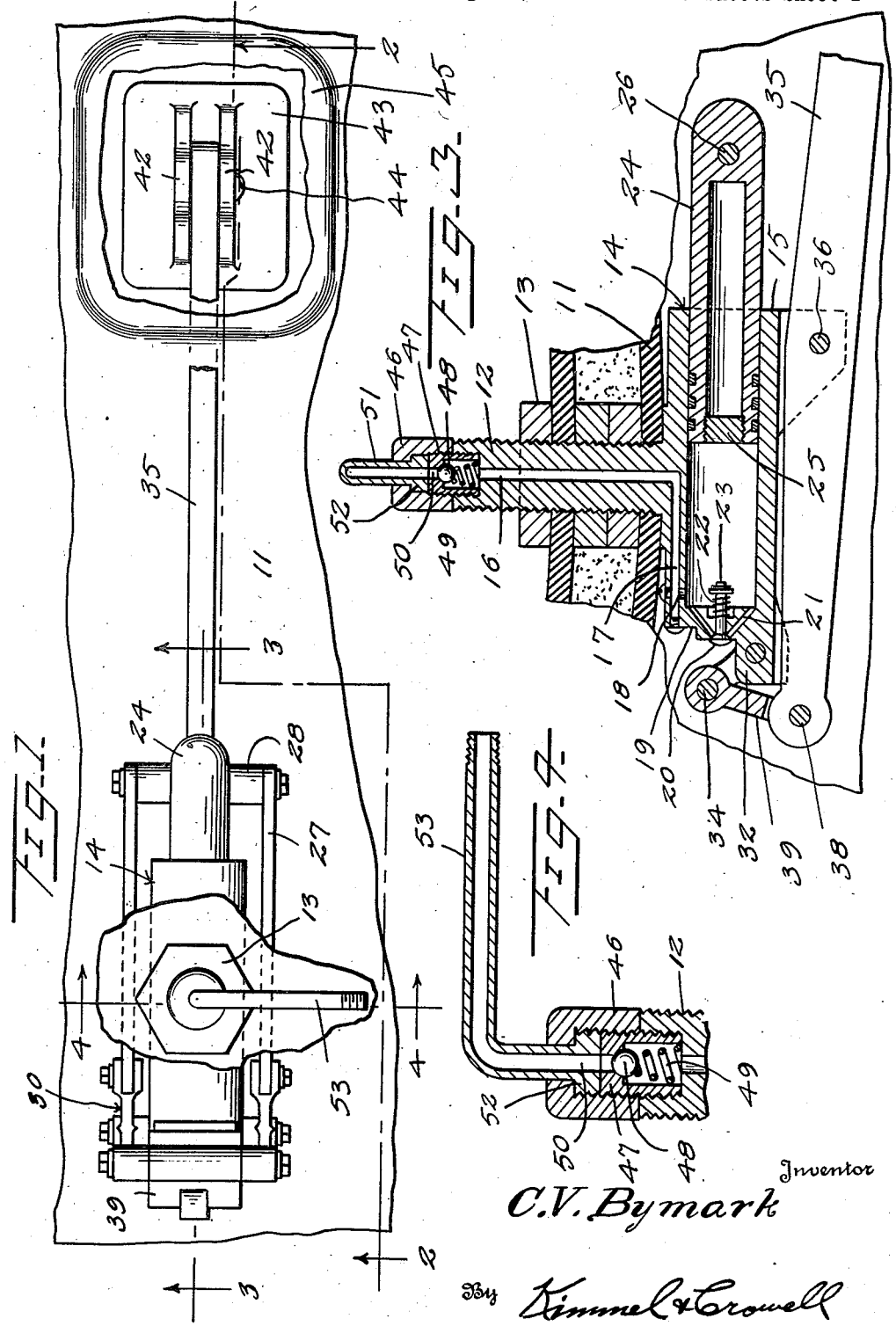
Inventor
C. V. Bymark
By Kimmel & Crowell
Attorneys

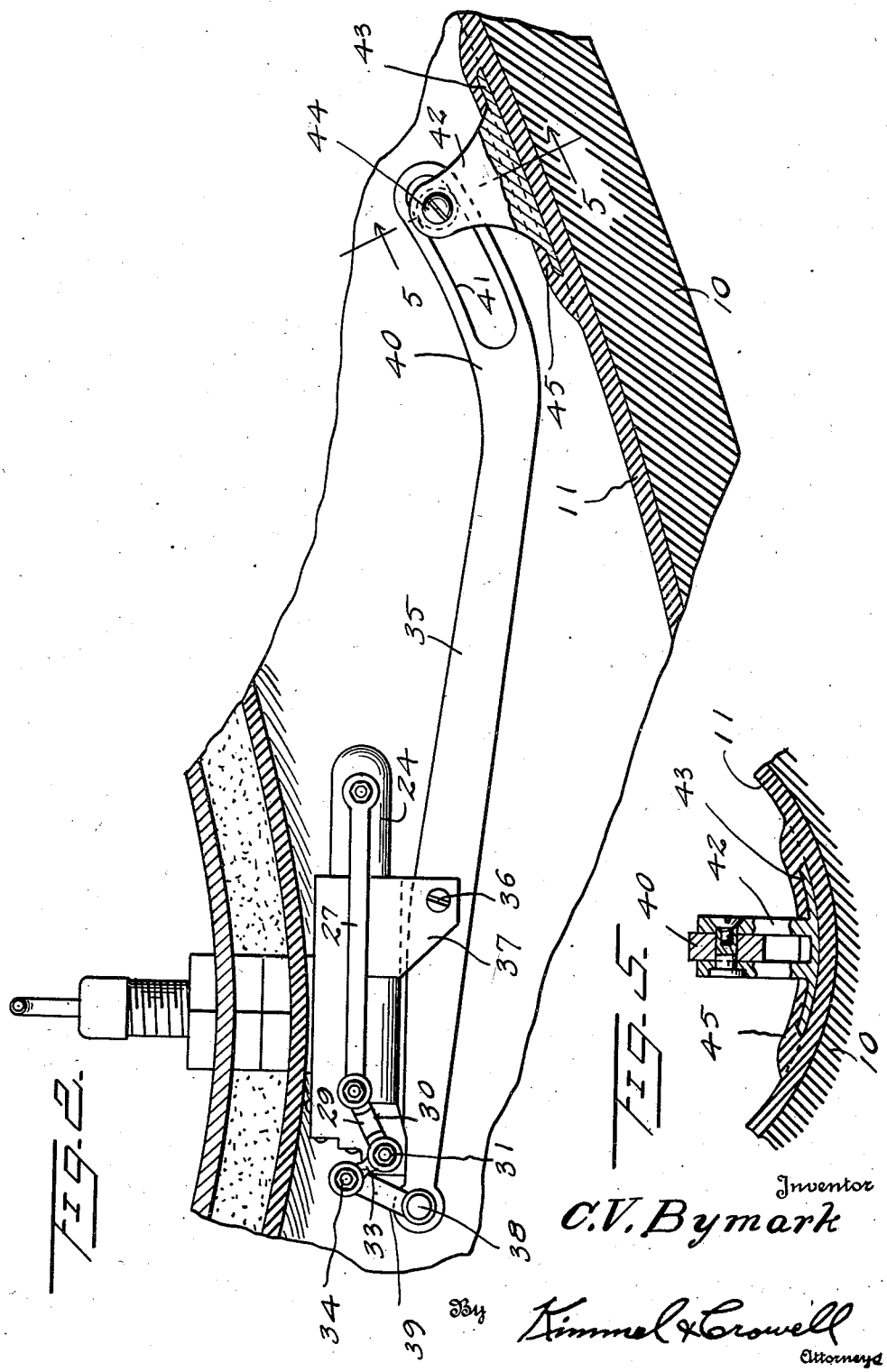

Patented May 6, 1947

2,420,224

UNITED STATES PATENT OFFICE 2,420,224

TIRE INFLATOR

Carl Victor Bymark, Biwabik, Minn.

Application August 21, 1944, Serial No. 550,419

1 Claim. (Cl. 152—426)

This invention relates to a tire inflating means.

An object of this invention is to provide a tire inflating means whereby the tire will be automatically inflated as the tire moves over a surface.

Another object of this invention is to provide a tire inflating means including a pump which is mounted interiorly of the tire and which is automatically operative when the tire is deflated to a predetermined degree.

A further object of this invention is to provide a tire inflator of this kind which is relatively simple in construction and which is positive in its action so as to provide a pumping stroke at each rotation of the tire when the latter is deflated to a predetermined degree.

With the foregoing objects and others which may hereinafter appear, the invention consists of the novel construction, combination and arrangement of parts as will be more specifically referred to and illustrated in the accompanying drawings, wherein are shown embodiments of the invention, but it is to be understood that changes, variations, and modifications may be resorted to which fall within the scope of the invention as claimed.

In the drawings:

Figure 1 is a plan view, partly broken away, of a tire inflating means constructed according to an embodiment of this invention.

Figure 2 is a sectional view, taken on the line 2—2 of Figure 1.

Figure 3 is a sectional view taken on the line 3—3 of Figure 1.

Figure 4 is a sectional view taken on the line 4—4 of Figure 1, and

Figure 5 is a sectional view taken on the line 5—5 of Figure 2.

Referring to the drawings, the numeral 10 designates generally an outer casing having an inner tube 11 mounted therein having a valve stem 12 connected therewith, the stem 12 being provided with a plurality of lock nuts 13 for securing the stem to the rim of the wheel.

In order to provide a means whereby the inner tube 11 may be automatically inflated when it has become deflated to a predetermined degree, I have provided an automatically operable pump, generally designated as 14. The pump 14 includes a cylinder 15 which is secured to or formed integral with a stem 12. The bore 16 of the stem 12 communicates with a passage 17 formed lengthwise of the cylinder 15, and an intake port 18 connects the passage 17 with the interior of the cylinder 15. The cylinder 15 is provided at one end thereof with a head 19 having a spring pressed valve 20 mounted therein. The valve 20 closes in the direction of the head 19 and preferably a plurality of passages 21 are formed in the head 19 and communicate the interior of the cylinder 15 with the valve seat on which the valve 20 engages. A spring 22 engages about the valve stem 23 and normally urges the valve member 20 to a closed position.

A piston 24 is slidably mounted in the cylinder 19 being provided with an inner head or plug 25. The outer end of the piston 24 has extending therethrough a shaft 26 with which a pair of links 27 are pivotally connected. Spacers 28 are disposed about the shaft 26 on opposite sides of the cylinder 24 and hold the links 27 spaced laterally from opposite sides of the cylinder. The forward ends of the links 27 are pivotally connected to one arm 29 of a bell crank 30 rockably mounted on a pivot 31. The pivot 31 is carried by an extension 32 formed integral with the forward end of the cylinder 15 and the other leg 33 of the bell crank 31 is pivotally mounted on a shaft 34. There are two of these bell cranks 30, and the shaft 34 is connected between the legs 33. An elongated piston operating lever 35 is rockably mounted on a pivot member 36 carried by a pair of outwardly extending ears 37 which are secured to or formed integral with the cylinder 15. The pivot 36 engages the lever 35 between the ends thereof, and the inner end of the lever 35 is pivotally mounted on a pivot 38 which is extended through a link 39. The link 39 is pivotally connected as at 34 between the bell crank sides 33 and extends inwardly and away from the adjacent end of the cylinder 15. The lever 35 at its outer end is formed with an obtusely disposed bend 40 which is formed with an elongated slot 41. A pair of inwardly projecting ears 42 are carried by a base plate 43, and a pin or bolt 44 extends between the ears 42 and engages within the slot 41. The base 43 is adapted to engage between overlapping flanges 45 which are vulcanized or otherwise further secured to the inner side of the tube 11 so that the base 43 will be held against sliding and lateral movement with respect to the tube 11. As the outer side of the tube 11 is flexed inwardly, the lever 35 is rocked, and rocking of this lever will effect lengthwise movement of the piston 24.

The valve stem 12 adjacent the outer end thereof has a cap 46 which is threaded onto an apertured plug 47 which is threaded into the outer end of the stem 12. A ball check valve 48 which is spring pressed by a spring 49 to an outer closing position, is adapted to close an opening 50 in the plug 47. A tube 51 having an enlarged flange 52 is mounted in the cap 46 and is formed with a laterally projecting bend or extension 53 which may be opened to the atmosphere so that when the pump 42 is reciprocated and is moving on its intake or suction stroke, valve member 48 will be moved inwardly to an open position whereby air may be drawn into the cylinder 15.

In the use and operation of this invention, the pump structure 14 is mounted within the tube 11 with the stem 12 projecting outwardly of the casing 10, and the tube 53 may be directed laterally of the casing in the desired direction. Assuming that the inner tube 11 is entirely inflated, the lever 35 will be inoperative during the normal rotation or movement of the tire. In the event the tube 11 becomes partially deflated when the outer end of the lever 35 is at the bottom of the wheel, the compression of the tube 11 at this point by the weight of the vehicle will rock lever 35 inwardly, and this inward rocking of lever 35 will move piston 24 inwardly of cylinder 15. Inward movement of piston 24 will force air in the cylinder 15 out through the passages 21 unseating valve 20 and forcing the air in the cylinder 15 into the interior of the tube. There will be a movement of the piston 24 on the pumping stroke thereof each time the outer end of the lever 35 is at the lowermost point of the wheel or tire. When lever 35 is at the uppermost point, piston 24 will be moved outwardly of cylinder 15 thereby drawing in air into the cylinder 15 and unseating check valve 48.

It will be apparent from the foregoing that the pump or inflating structure hereinbefore described will be active before inner tube 11 becomes entirely deflated so that the tube 11 will be maintained in its normally inflated condition at all times during the rotation of the tire. This structure may be made of relatively light material so that it will not add unduly to the weight of the tire or wheel, and being simple in construction will not readily get out of order.

What is claimed is:

A tire inflating device comprising the combination with an innertube and a tire, of an air pump disposed within the innertube and fixed relative to said tire and rotatable therewith, said pump including a cylinder, a piston slidable in said cylinder, a valve stem comprising a ball check valve connected to said cylinder, a bell crank rockably carried by one end of said cylinder, a pair of arms carried by the other end of said cylinder, a link connected to said piston in said other end of said cylinder and one arm of said bell crank, an elongated operating lever pivotally carried by said arms extending from said other end of said cylinder, a second link connecting one end of said lever to the other arm of said bell crank, an elongated opening in the other end of said lever, means fixed relative to said tire slidably connected with the other end of said lever through said elongated opening whereby to rock said lever and reciprocate said piston at each revolution of said tire with said tire in partially deflated condition.

CARL VICTOR BYMARK.

REFERENCES CITED

The following references are of record in the file of this patent:

UNITED STATES PATENTS

| Number | Name | Date |
| --- | --- | --- |
| 535,505 | Moore | Mar. 12, 1895 |

FOREIGN PATENTS

| Number | Country | Date |
| --- | --- | --- |
| 412,521 | French | 1910 |